US008744940B2

(12) United States Patent
White et al.

(10) Patent No.: US 8,744,940 B2
(45) Date of Patent: Jun. 3, 2014

(54) SYSTEM AND METHOD FOR DISTRIBUTING MOBILE COMPENSATION AND INCENTIVES

(76) Inventors: William O. White, Boulder, CO (US); Douglas J. Hurst, Niwot, CO (US)

( * ) Notice: Subject to any disclaimer, the term of this patent is extended or adjusted under 35 U.S.C. 154(b) by 137 days.

(21) Appl. No.: 13/349,621

(22) Filed: Jan. 13, 2012
(Under 37 CFR 1.47)

(65) Prior Publication Data

US 2013/0144690 A1 Jun. 6, 2013

Related U.S. Application Data

(63) Continuation-in-part of application No. 12/343,423, filed on Dec. 23, 2008, now Pat. No. 8,463,674, and a continuation-in-part of application No. 12/343,425, filed on Dec. 23, 2008.

(60) Provisional application No. 61/018,809, filed on Jan. 3, 2008, provisional application No. 61/025,201, filed on Jan. 31, 2008.

(51) Int. Cl.
*G06Q 40/00* (2012.01)
*G06Q 40/02* (2012.01)

(52) U.S. Cl.
CPC ..................................... *G06Q 40/02* (2013.01)
USPC .................. 705/35; 705/37; 705/39; 705/40; 705/26; 726/28; 709/206; 719/318; 235/385

(58) Field of Classification Search
USPC .......... 705/14, 37, 35, 39, 40, 44, 26; 726/28; 709/206; 719/318; 238/385
See application file for complete search history.

(56) References Cited

U.S. PATENT DOCUMENTS

| 5,991,749 | A | 11/1999 | Morrill |
| 6,675,153 | B1 | 1/2004 | Cook et al. |
| 7,043,451 | B2 | 5/2006 | Strayer et al. |
| 7,155,411 | B1* | 12/2006 | Blinn et al. ..................... 705/40 |
| RE39,736 | E | 7/2007 | Morrill |
| 7,275,685 | B2 | 10/2007 | Gray et al. |
| 7,315,828 | B1 | 1/2008 | McCarthy et al. |
| 7,337,144 | B1 | 2/2008 | Blinn et al. |
| 7,395,242 | B2 | 7/2008 | Blinn et al. |

(Continued)

FOREIGN PATENT DOCUMENTS

| EP | 2122557 | 11/2009 |
| WO | WO-2008-089383 A2 | 7/2008 |

OTHER PUBLICATIONS

International Search Report and Written Opinion, Int'l App. No. PCT/US08/51395, dated Jul. 8, 2008, 7 pgs.

(Continued)

*Primary Examiner* — Tien Nguyen
(74) *Attorney, Agent, or Firm* — Holland & Hart LLP

(57) ABSTRACT

A system and method for distributing incentives via mobile devices is described. One embodiment, a computer-server-based method, receives a request from a merchant to generate an incentive which incentive is funded and initiated by the merchant, receives the incentive, associates the incentive with a recipient's phone number, and transmits a notification of the incentive to a mobile device associated with the recipient's phone number, the computer server acting as a server-side wallet for the incentive, the incentive being usable, through interaction with the computer server, by the recipient for the purchase of goods or services from the merchant associated with the incentive.

20 Claims, 5 Drawing Sheets

(56) References Cited

U.S. PATENT DOCUMENTS

| | | |
|---|---|---|
| 7,398,250 B2 | 7/2008 | Blinn et al. |
| 7,512,552 B2 | 3/2009 | Karas et al. |
| 7,657,489 B2 | 2/2010 | Stambaugh |
| 7,707,120 B2 | 4/2010 | Dominguez et al. |
| 7,716,082 B1 | 5/2010 | Blalock |
| 7,720,764 B2 * | 5/2010 | Emerson et al. ............... 705/44 |
| 8,024,664 B1 * | 9/2011 | Marciel et al. ............... 715/760 |
| 8,027,873 B2 * | 9/2011 | Drefs et al. ............... 705/14.27 |
| 8,083,135 B2 | 12/2011 | Hodgkinson et al. |
| 8,260,683 B2 * | 9/2012 | Crussol et al. ............... 705/26.42 |
| 2001/0029496 A1 | 10/2001 | Otto et al. |
| 2002/0059146 A1 | 5/2002 | Keech |
| 2002/0082920 A1 * | 6/2002 | Austin et al. ............... 705/14 |
| 2002/0139848 A1 * | 10/2002 | Catan ............... 235/385 |
| 2002/0181710 A1 | 12/2002 | Adam et al. |
| 2003/0018579 A1 | 1/2003 | Litster et al. |
| 2003/0053609 A1 | 3/2003 | Risafi et al. |
| 2003/0154139 A1 | 8/2003 | Woo |
| 2003/0200184 A1 | 10/2003 | Dominguez et al. |
| 2004/0030659 A1 | 2/2004 | Gueh |
| 2004/0049455 A1 | 3/2004 | Mohsenzadeh |
| 2004/0093277 A1 * | 5/2004 | Faerch et al. ............... 705/26 |
| 2004/0103060 A1 | 5/2004 | Foth et al. |
| 2004/0122685 A1 | 6/2004 | Bunce |
| 2004/0230536 A1 | 11/2004 | Fung et al. |
| 2005/0033686 A1 | 2/2005 | Peart et al. |
| 2005/0108127 A1 * | 5/2005 | Brown et al. ............... 705/35 |
| 2005/0177517 A1 | 8/2005 | Leung et al. |
| 2006/0016880 A1 | 1/2006 | Singer et al. |
| 2006/0036501 A1 | 2/2006 | Shahbazi et al. |
| 2006/0111983 A1 | 5/2006 | Malison |
| 2006/0224449 A1 * | 10/2006 | Byerley et al. ............... 705/14 |
| 2006/0224470 A1 | 10/2006 | Ruano et al. |
| 2006/0235795 A1 | 10/2006 | Johnson et al. |
| 2006/0235796 A1 | 10/2006 | Johnson et al. |
| 2006/0265243 A1 | 11/2006 | Racho et al. |
| 2007/0005445 A1 * | 1/2007 | Casper ............... 705/26 |
| 2007/0022058 A1 | 1/2007 | Labrou et al. |
| 2007/0063020 A1 | 3/2007 | Barrafato |
| 2007/0138268 A1 | 6/2007 | Tuchman |
| 2007/0156517 A1 * | 7/2007 | Kaplan et al. ............... 705/14 |
| 2007/0175978 A1 | 8/2007 | Stambaugh |
| 2007/0179844 A1 * | 8/2007 | Brannon et al. ............... 705/14 |
| 2007/0179850 A1 * | 8/2007 | Ganjon et al. ............... 705/14 |
| 2007/0179888 A1 | 8/2007 | Angelovich |
| 2007/0192186 A1 * | 8/2007 | Greene et al. ............... 705/14 |
| 2007/0198354 A1 | 8/2007 | Senghore et al. |
| 2007/0203778 A1 | 8/2007 | Lowson et al. |
| 2007/0205275 A1 | 9/2007 | Nicola et al. |
| 2007/0239556 A1 | 10/2007 | Wagner |
| 2007/0288392 A1 | 12/2007 | Peng et al. |
| 2008/0011825 A1 | 1/2008 | Giordano et al. |
| 2008/0046366 A1 | 2/2008 | Bemmel et al. |
| 2008/0052164 A1 | 2/2008 | Abifaker |
| 2008/0052189 A1 | 2/2008 | Walker et al. |
| 2008/0077527 A1 | 3/2008 | Choe et al. |
| 2008/0082418 A1 * | 4/2008 | Fordyce et al. ............... 705/14 |
| 2008/0097851 A1 | 4/2008 | Bemmel et al. |
| 2008/0103984 A1 | 5/2008 | Choe et al. |
| 2008/0189189 A1 | 8/2008 | Morgenstern |
| 2008/0207234 A1 | 8/2008 | Arthur et al. |
| 2008/0208741 A1 | 8/2008 | Arthur et al. |
| 2008/0208742 A1 | 8/2008 | Arthur et al. |
| 2008/0208743 A1 | 8/2008 | Arthur et al. |
| 2008/0208744 A1 | 8/2008 | Arthur et al. |
| 2008/0208762 A1 | 8/2008 | Arthur et al. |
| 2008/0223918 A1 | 9/2008 | Williams et al. |
| 2008/0249938 A1 | 10/2008 | Drake-Stoker |
| 2008/0255941 A1 | 10/2008 | Otto et al. |
| 2008/0255947 A1 | 10/2008 | Friedman |
| 2008/0267117 A1 | 10/2008 | Stern |
| 2008/0281737 A1 | 11/2008 | Fajardo |
| 2008/0296368 A1 | 12/2008 | Newsom |
| 2009/0012901 A1 | 1/2009 | Singh et al. |
| 2009/0037286 A1 | 2/2009 | Foster |
| 2009/0063312 A1 | 3/2009 | Hurst |
| 2009/0138366 A1 | 5/2009 | Bemmel et al. |
| 2009/0164326 A1 | 6/2009 | Bishop et al. |
| 2009/0164331 A1 | 6/2009 | Bishop et al. |
| 2009/0171804 A1 | 7/2009 | Lee et al. |
| 2009/0182663 A1 | 7/2009 | Hurst |
| 2009/0182676 A1 | 7/2009 | Barbier et al. |
| 2009/0265241 A1 | 10/2009 | Bishop et al. |
| 2009/0298481 A1 | 12/2009 | Hurst |
| 2009/0307132 A1 | 12/2009 | Phillips |
| 2010/0030698 A1 | 2/2010 | Goodin |
| 2010/0041368 A1 | 2/2010 | Kumar |
| 2010/0063895 A1 | 3/2010 | Dominguez et al. |
| 2010/0241494 A1 * | 9/2010 | Kumar et al. ............... 705/14.1 |
| 2011/0106603 A1 * | 5/2011 | McCann et al. ............... 705/14.21 |
| 2012/0028612 A1 | 2/2012 | Hurst |
| 2012/0030044 A1 | 2/2012 | Hurst |
| 2012/0209771 A1 * | 8/2012 | Winner et al. ............... 705/44 |

OTHER PUBLICATIONS

European Search Report and Opinion, EP App. No. 08705998.6, dated Dec. 29, 2010, 5 pgs.

European Patent Office, "Notice from the European Patent Office dated Oct. 1, 2007 concerning business methods" Official Journal of the European Patent Office, vol. 30, No. 11, Nov. 1, 2007, pp. 592-593.

* cited by examiner

US 8,744,940 B2

SYSTEM AND METHOD FOR DISTRIBUTING MOBILE COMPENSATION AND INCENTIVES

CROSS REFERENCES

The present application is a continuation in part of U.S. patent application Ser. No. 12/343,423, filed on Dec. 23, 2008, entitled "System and Method for Distributing Mobile Gift Cards," and U.S. patent application Ser. No. 12/343,425, filed on Dec. 23, 2008, entitled "System and Method for Re-Distributing and Transferring Mobile Gift Cards," each of which is incorporated herein by reference in its entirety and for all purposes and each of which claims priority from U.S. Provisional Patent Application No. 61/018,809, entitled "System and Method for Distributing Mobile Gift Cards," filed on Jan. 3, 2008, and U.S. Provisional Patent Application No. 61/025,201, entitled "System and Method for Re-Distributing and Transferring Mobile Gift Cards," filed on Jan. 31, 2008, both of which are also incorporated herein by reference in their entirety and for all purposes.

BACKGROUND

1. Field of the Invention

This invention relates generally to electronic commerce. More specifically, but not by way of limitation, the present invention relates to systems and methods for distributing compensation and incentives via mobile devices.

2. Background of the Invention

Incentives have become increasingly popular in recent years as a way to reward loyal patrons for their business and as a way to entice new patrons to patronize a merchant's business. Most incentives are in a physical form such as a coupon or card that requires the patron to remember the incentive and carry it with them in order to redeem that incentive. For a mobile device user who wishes to conduct all financial transactions via his or her mobile device, carrying additional items in order to redeem incentives is undesirable. Accordingly, there is a need to provide systems and methods for distributing and redeeming mobile incentives.

SUMMARY

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

The present invention can provide a system and method for distributing mobile incentives. One illustrative embodiment is a computer-server-based method for distributing a mobile incentive, comprising receiving a selection of a merchant with which to associate the mobile incentive; receiving an indication of a monetary amount for the mobile incentive; receiving an electronic payment for the monetary amount; applying the monetary amount to the mobile incentive; associating the mobile incentive with a recipient's phone number; and transmitting a notification of the mobile incentive to a mobile device associated with the recipient's phone number; wherein the computer server acts as a server-side wallet for the mobile incentive, and the mobile incentive is usable, through interaction with the computer server, by the recipient for the purchase of goods or services, from the merchant associated with the mobile incentive.

Another illustrative embodiment is a system for distributing a mobile incentive, comprising at least one processor; and a memory containing a plurality of program instructions executable by the at least one processor, the plurality of program instructions being configured to cause the at least one processor to receive a request from a merchant to generate a mobile incentive; identify the mobile incentive; associate the mobile incentive with a recipient's phone number; and transmit a notification of the mobile incentive to a mobile device associated with the recipient's phone number; wherein the system acts as a server-side wallet for the mobile incentive, and the mobile incentive is usable, through interaction with the system, by the recipient for the purchase of goods or services from the merchant associated with the mobile incentive.

These and other embodiments are described in further detail herein.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. Various objects and advantages and a more complete understanding of the present invention are apparent and more readily appreciated by reference to the following Detailed Description and to the appended claims when taken in conjunction with the accompanying drawings, wherein:

DETAILED DESCRIPTION OF THE INVENTION

In various illustrative embodiments of the invention, the limitations of conventional physical and electronic compensation and incentives are overcome by replacing the physical form factor of plastic, magnetically encoded cards with a mobile device such as a cellular telephone in a manner that leaves intact existing compensation and incentive systems and services operated by card service providers.

From time to time, providers of goods and services wish to provide their customers with incentives. Providers of goods and services may also be referred to as merchants or the "merchant" in the discussion herein. An incentive can be, for example, a percentage discount on a future purchase, a percentage discount to be taken on the current transaction, a free good or service up to a specific dollar amount, a buy one, get one coupon, a specific dollar amount to be provided as 'cash back' for future transactions, loyalty point addition, subtraction or redemption, or a specific redeemable dollar amount to be taken on the current transaction. Incentives as described herein as merchant funded and, thus, operate differently from gift cards or other forms of payment cards. One of skill in the art will recognize that an incentive can be in any form that can be transferred as an electronic coupon that pertains to the goods or services provided by the merchant or "merchant."

A mobile-incentive platform in accordance with these illustrative embodiments provides, among other things, a server-side digital wallet for mobile incentives that overcomes the shortcomings (e.g., risk of loss or theft) associated with virtual incentives or incentive certificates that reside within the mobile device itself. In these illustrative embodiments, no credentials (account numbers, balances, or other sensitive information) associated with the mobile incentive reside in the mobile device itself. Instead, a secure network infrastructure distributes and manages the mobile incentives and their associated credentials, the mobile device acting merely as one means for the user to communicate with the server-side digital wallet to access a variety of flexible services surrounding use of the mobile incentives.

Such flexible services include, without limitation, the ability of a user to view a list of all available mobile incentives in his or her server-side digital wallet, the ability to view the current balance of any particular mobile incentive, the ability to purchase securely goods or services from the merchant associated with a particular incentive using the mobile device at the point of sale (however, the option to use a physical card is not preempted by the mobile-incentive-card platform described herein), and the ability to transfer some or all of the balance of a particular mobile incentive to another person.

Figure 1:
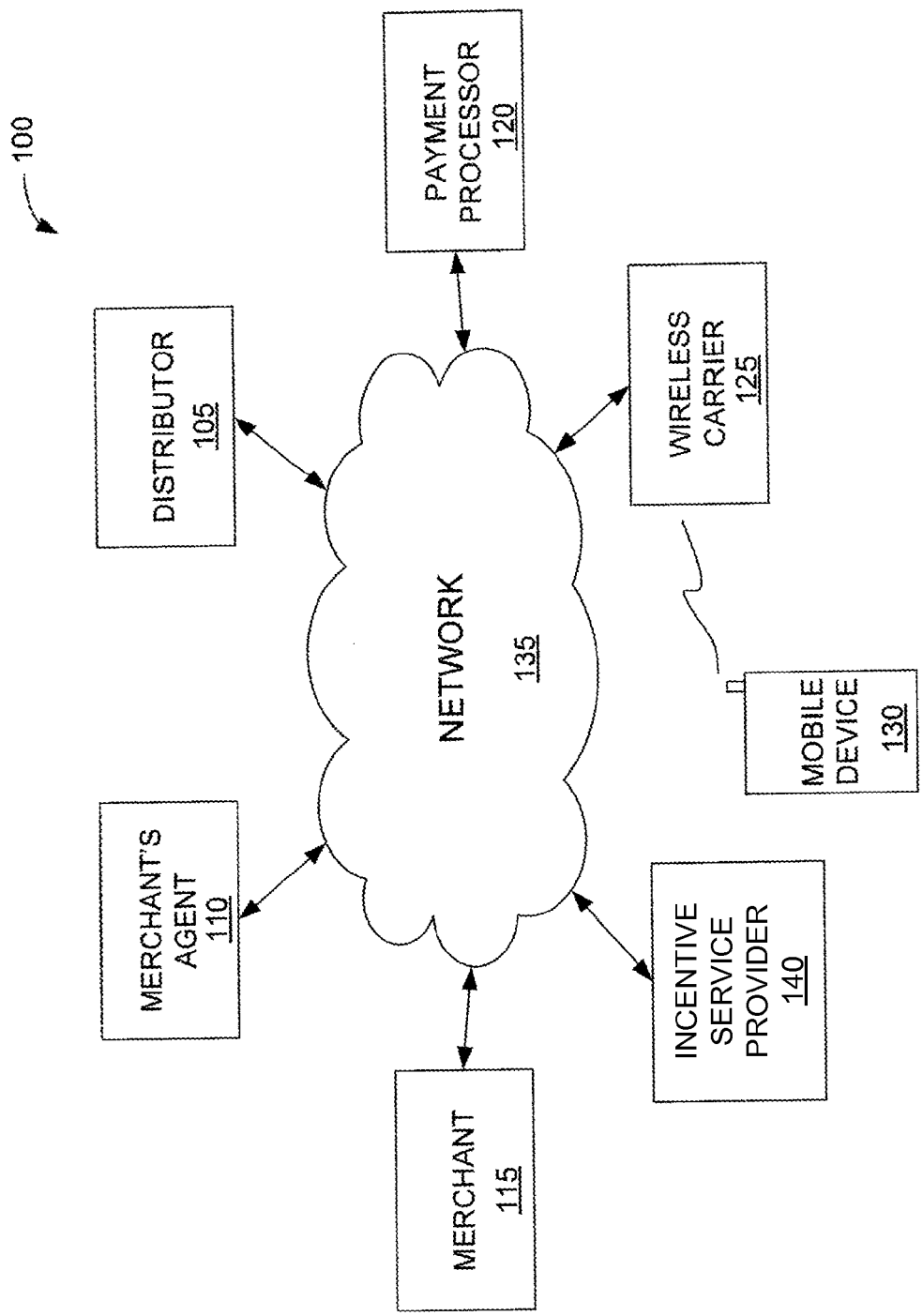
FIG. 1 is a functional block diagram of an environment in which various illustrative embodiments of the invention can be implemented.

Referring now to the drawings, where like or similar elements are designated with identical reference numerals throughout the several views, and referring in particular to FIG. 1, it is a functional block diagram of an environment 100 in which various illustrative embodiments of the invention can be implemented. In environment 100, distributor 105, merchant's agent 110, merchant 115, payment processor 120, wireless carrier 125, and incentive-card service provider 140 are able to communicate with one another via network 135. A user's mobile device 130—e.g., a cellular or Personal Communication Service (PCS) phone—is also able to communicate with nodes connected with network 135 via wireless carrier 125. In some embodiments, network 135 includes, but is not necessarily limited to, the Internet.

The environment 100 in FIG. 1 builds on existing incentive-card systems and payment card systems that can be operated by incentive-card service provider 140 or payment providers such as, without limitation, FIRST DATA and COMDATA. Incentive service provider 140, among other things, can administer the financial aspects of incentives for the merchant or the merchant can facilitate the financial aspects without the use of a service provider, including keeping track of the balance associated with a particular incentive, settlement, reporting to merchants, and other functions.

Merchant 115 sells goods, services, or both and provides mobile incentives to consumers, sometimes with the assistance of merchant's agent 110. That is, merchant's agent 110 can facilitate or merchant can facilitate the distribution and sale of mobile incentives issued by merchant 115 by acting as an intermediary between merchant 115 and any of the following: (1) a incentive-card service provider 140, (2) mobile-incentive-card distributor 105, (3) mobile-incentive-card purchasers (those giving the mobile incentives to others), and (4) mobile-incentive-card recipients (consumers who use the mobile incentives in commerce). It should be noted by one of skill in the art that a merchant's agent is not necessary to the invention but is rather one description of a commercial reality for merchants. A consumer holding such a mobile incentive can use the mobile incentive to redeem goods or services or in connection with the purchase of goods or services from the particular merchant that issued the mobile incentive, as explained above. How the holder of a mobile incentive redeems the mobile incentive from the issuing merchant is discussed further below.

Payment processor 120 processes the source of funds for transactions carried out from a user's mobile device such as the user's application of a mobile incentive or purchase of a mobile incentive on behalf of someone else. In such transactions, payment processor 120 acts as an agent of the merchant to collect funds from the user's credit card or other payment source, should the amount of the transaction exceed the amount associated with the mobile incentive. In some embodiments, an entity acting as a payment processor 120 in certain contexts may also be a distributor 105 in other contexts.

Distributor 105 can take on a variety of different forms, depending on the particular embodiment.

In one embodiment, distributor 105 is an entity (not necessarily a merchant but possibly the merchant) that operates a Web site or other electronic communication channel where mobile incentives for a number of different merchants are offered in an aggregated fashion. In another embodiment, a single merchant markets its mobile incentives via remote distribution channels, local distribution channels, or both. For example, a merchant may market its mobile incentives via a remote distribution channel such as a Web site or other networked electronic communication channel using Application Programming Interfaces (APIs) supplied by merchant's agent 110 or another entity. That is, a merchant may use flexible APIs provided by merchant's agent 110 to customize a Web site or other networked electronic communication channel to offer its mobile incentives in a manner consistent with the merchant's particular brand identify, logos, etc. A merchant may also employ local distribution methods in a store (at the point of sale). In such an embodiment, the mobile incentive can be "mobilized" (made accessible to the recipient via the recipient's mobile device) at the point of sale.

Figure 2:
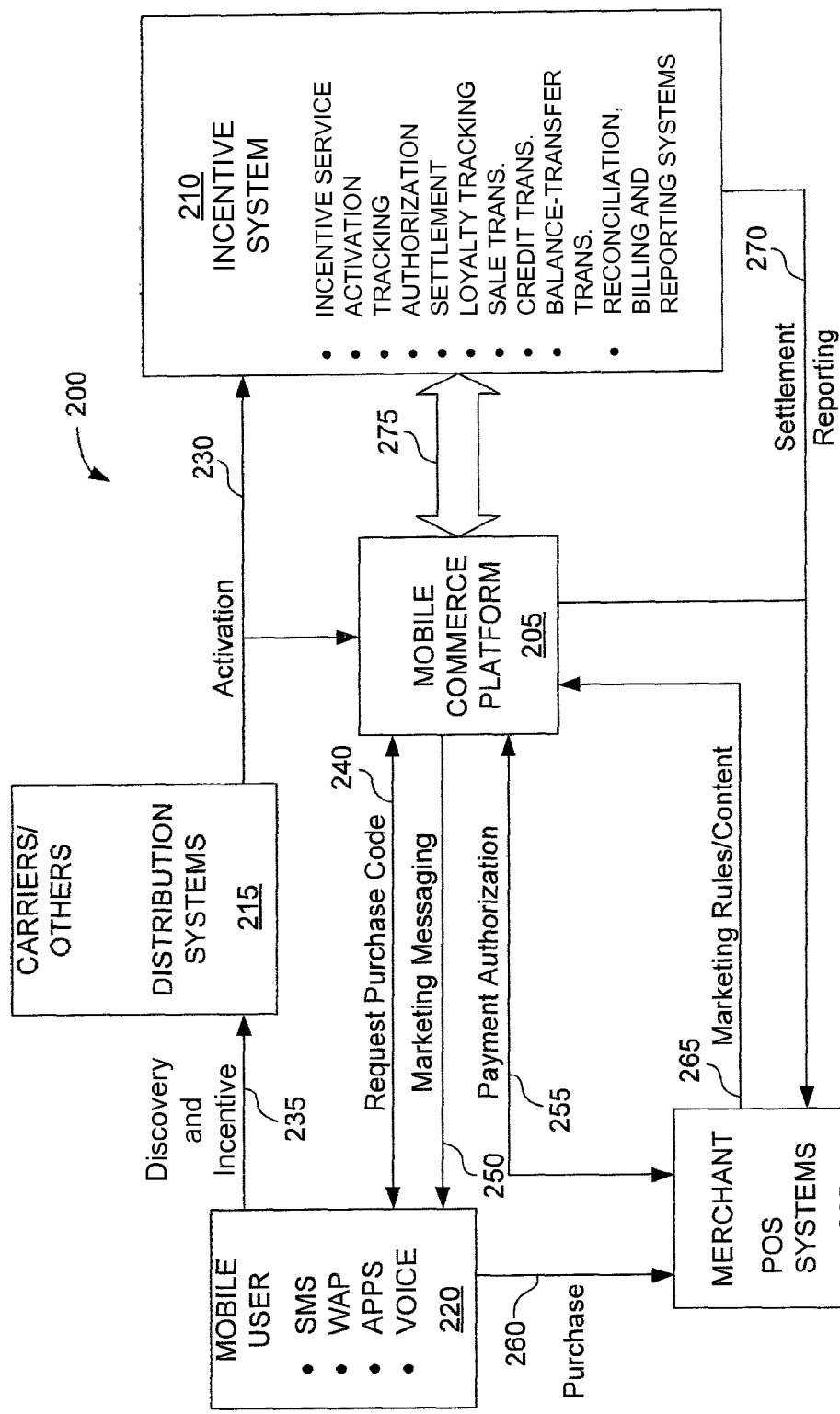
FIG. 2 is a diagram showing interactions among various entities involved in the distribution and use of mobile incentives, in accordance with an illustrative embodiment of the invention.

FIG. 2 is a diagram showing interactions among various entities 200 involved in the distribution and use of mobile incentives, in accordance with an illustrative embodiment of the invention. In FIG. 2, incentive system 210 represents a system operated by a conventional incentive-card service provider 140 such as, without limitation, FIRST DATA, Mocapay, or COMDATA. Various embodiments of the invention preserve the existing payments infrastructure supporting the use of incentives and overlay them with a mobile commerce platform 205, which is explained below. Other entities involved are a mobile-payments-enabled merchant (sometimes called simply a "merchant" herein) 225, a mobile user 220, and carriers or other entities ("CARRIERS/OTHERS" in FIG. 2) 215 and their associated distribution systems (see distributor 105 in FIG. 1). In the discussion of FIG. 2 below, interactions among these entities are identified by their corresponding reference numerals in parentheses.

In some embodiments, mobile user 220 can use a variety of different access methods such as, without limitation, Short Message Service (SMS) messages, Multimedia Message Service (MMS) messages, Wireless Access Protocol (WAP), an application, or voice to obtain one-use perishable authorization codes request purchase code 240 from mobile commerce platform 205 in making payments from a variety of different tenders (forms of payment), including mobile incentives.

Mobile user 220 can also use a variety of methods, including the above examples, to provide one-use perishable authorization codes to merchant 225 in making electronic purchase 260. Additional details regarding such mobile-payment technology can be found in U.S. patent application Ser. No. 11/624,620, entitled "Systems and Method for Secure Wireless Payment Transactions," which is incorporated herein by reference in its entirety.

Mobile user 220 may also receive targeted marketing messages 250 before, during, or after a mobile purchase via mobile commerce platform 205 and may purchase 235 mobile incentives from a carrier 215 (e.g., T-MOBILE, AT&T, VERIZON WIRELESS, etc.) or other distributor 105 such as a social networking Web site. The targeted marketing messages are assisted by the ability of merchant 225 to submit marketing rules, content, or both 265 to mobile commerce platform 205.

Merchant 225 receives payment authorization 255 from mobile commerce platform 205 in conjunction with the mobile payments technology mentioned above in connection with U.S. patent application Ser. No. 11/624,620. The mobile payments process is summarized briefly below.

Mobile commerce platform 205 facilitates the activation 230 of mobile incentives sold by a carrier or other entity 215 (or other distributor 105) in cooperation with incentive system 210 via communication link 275. Incentive system 210 also provides, among other things, settlement and reporting services 270 to merchant 225.

When mobile user 220 makes a purchase using a mobile incentive, mobile user 220 contacts mobile commerce platform 205 using any of a variety of access methods (e.g., SMS, MMS, WAP or other browser technology, application, voice) to provide an optional personal identification number (PIN) by which mobile commerce platform 205 authenticates mobile user 220 request purchase code 240. Mobile commerce platform 205 provides mobile user 220 with one-time perishable (time-limited) authorization codes and balances request purchase code 240 for various tenders available to that user, including mobile incentives. In the present example, customer or mobile user 220 selects a specific mobile incentive to be used in making the purchase and a specific payment card to be used to complete the transaction. The mobile-payments-enabled merchant 225 submits the authorization code provided by mobile user 220 and the transaction amount to mobile commerce platform 205 payment authorization 255. Mobile commerce platform 205 routes the transaction parameters to incentive system 210, which ensures that the requested amount is available on the indicated mobile incentive and the payment card has the available funds to complete the transaction. If everything checks out, incentive system 210 informs mobile commerce platform 205, which, in turn, conveys a return authorization to the merchant 225, completing the transaction payment authorization 255.

Figure 3:
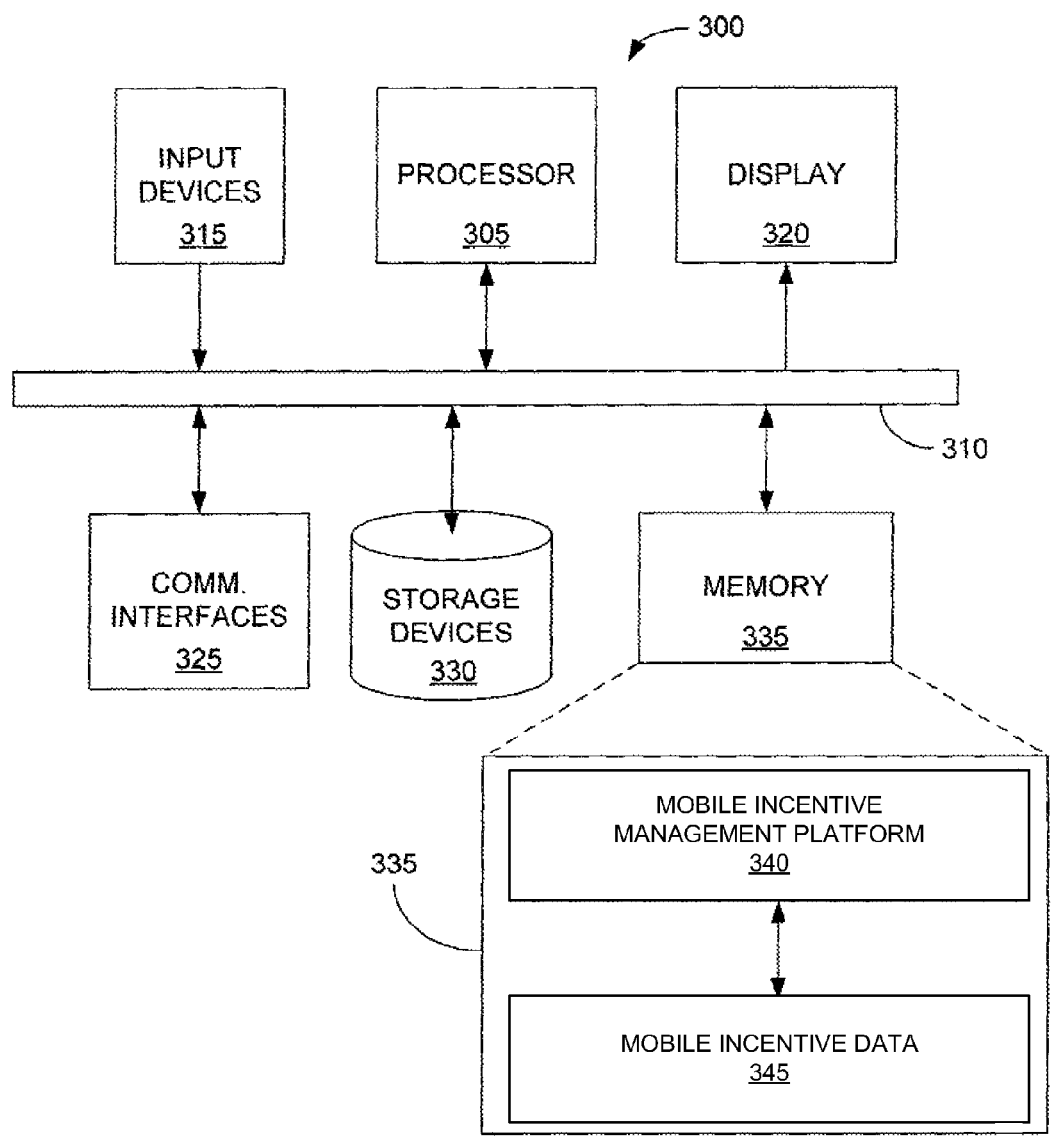
FIG. 3 is a functional block diagram of a server that distributes and manages mobile incentives in accordance with an illustrative embodiment of the invention.

With this high-level background in place, the remainder of this Detailed Description focuses primarily on the distribution and transfer of mobile incentives, primarily from the merchant to the consumer but the server can be configured to allow the transfer of an incentive from one consumer to another. FIG. 3 is a functional block diagram of a computer server ("server") 300 that distributes and manages mobile incentives in accordance with an illustrative embodiment of the invention. In this embodiment, server 300 is part of mobile commerce platform 205 (see FIG. 2). In FIG. 3, processor 305 communicates over data bus 310 with input devices 315, display 320, communication interfaces 325 ("COMM. INTERFACES" in FIG. 3), storage devices 330 (e.g., hard disk drives or flash memory), and memory 335. Though FIG. 3 shows only a single processor, multiple processors or a multi-core processor may be present in some embodiments.

Input devices 315 include, for example, a keyboard, a mouse or other pointing device, or other devices that are used to input data or commands to server 300 to control its operation. Communication interfaces 325 may include, for example, various serial or parallel interfaces for communicating with network 135 (see FIG. 1) or one or more peripherals.

Memory 335 may include, without limitation, random access memory (RAM), read-only memory (ROM), flash memory, magnetic storage (e.g., a hard disk drive), optical storage, or a combination of these, depending on the particular embodiment. In FIG. 3, memory 335 includes mobile incentive management platform 340, which distributes and manages mobile incentives. In doing so, mobile incentive management platform 340 accesses and manipulates mobile incentive data 345, which may reside, at least in part, on storage devices 330.

As mentioned above, mobile incentive management platform 340 implements a server-side digital wallet for the mobile incentive data 345. A "mobile incentive" is, thus, a digital construct (stored digital data) that replaces a physical (e.g., plastic, magnetically encoded) incentive. It should be noted that an incentive is a merchant funded device; i.e, the merchant is the entity that provides the financial account for "funding" the incentive. In other words, instead of the consumer's account covering the amount of the transaction, the merchant's account is debited or reduced to cover the amount of the incentive. The mobile incentive is also initiated by the merchant and transmitted to the consumer as part of the consumer registration in the mobile payments platform. The consumer does not initiate the activation of the incentive; rather activation of the incentive is automatic once the merchant initiates and funds the incentive. In this illustrative embodiment, server 300 stores account information for each mobile-incentive holder. That is, each mobile-incentive user initially creates an account on server 300. This account information includes, for each mobile incentive belonging to a particular user, (1) the user's mobile phone number, (2) the account number of the particular mobile incentive (analogous to a bar code of a physical coupon or incentive), and (3) the merchant that issued the mobile incentive. In some embodiments, server 300 stores additional information or different information from that just indicated. Note, however, that, in this particular embodiment, the balance remaining on the mobile incentive is not stored on server 300. Instead, the balance is tracked by the incentive service provider 140 that operates the applicable incentive system 210. As mentioned above, no credentials associated with a mobile incentive reside on the user's mobile device.

In one illustrative embodiment, mobile incentive management platform 340 is implemented as software that is executed by processor 305. Such software may be stored, prior to its being loaded into RAM for execution by processor 305, on any suitable computer-readable storage medium such as a hard disk drive, an optical disk, or a flash memory. In general, the functionality of mobile incentive management platform 340 may be implemented as software, firmware, hardware, or any combination or sub-combination thereof. The methods carried out by mobile incentive management platform 340 are explained more fully below in connection with FIGS. 4-5A and 5B.

A typical application for mobile incentive is a situation in which User A (typically, a merchant or provider of goods and services) wishes to give User B (typically, a customer of the merchant) an incentive (e.g., User B has been a loyal patron and User A wishes to reward User B's loyalty). From a user perspective, User A can communicate with server 300 of mobile commerce platform 205 in a variety of different ways to purchase a mobile incentive for User B. Examples include, without limitation, a Web site hosted by server 300 (or another server elsewhere on the network) and visited by User A using a client personal computer (PC), a Web site or other portal accessed using User A's cellular or PCS phone, a visit by User A at the merchant's store, or other avenues (e.g., User A's wireless carrier or a social networking Web site), as discussed above. User A can employ methods such as, without limitation, SMS, MMS, WAP (a microbrowser on a mobile device), or voice (in person or over the phone) to initiate an incentive for User B. In general, User A simply needs a way to communicate, directly or indirectly, with server 300. The foregoing example of User A providing a mobile incentive for User B will be referred to frequently in the description of FIGS. 4-5 that follows.

Figure 4:
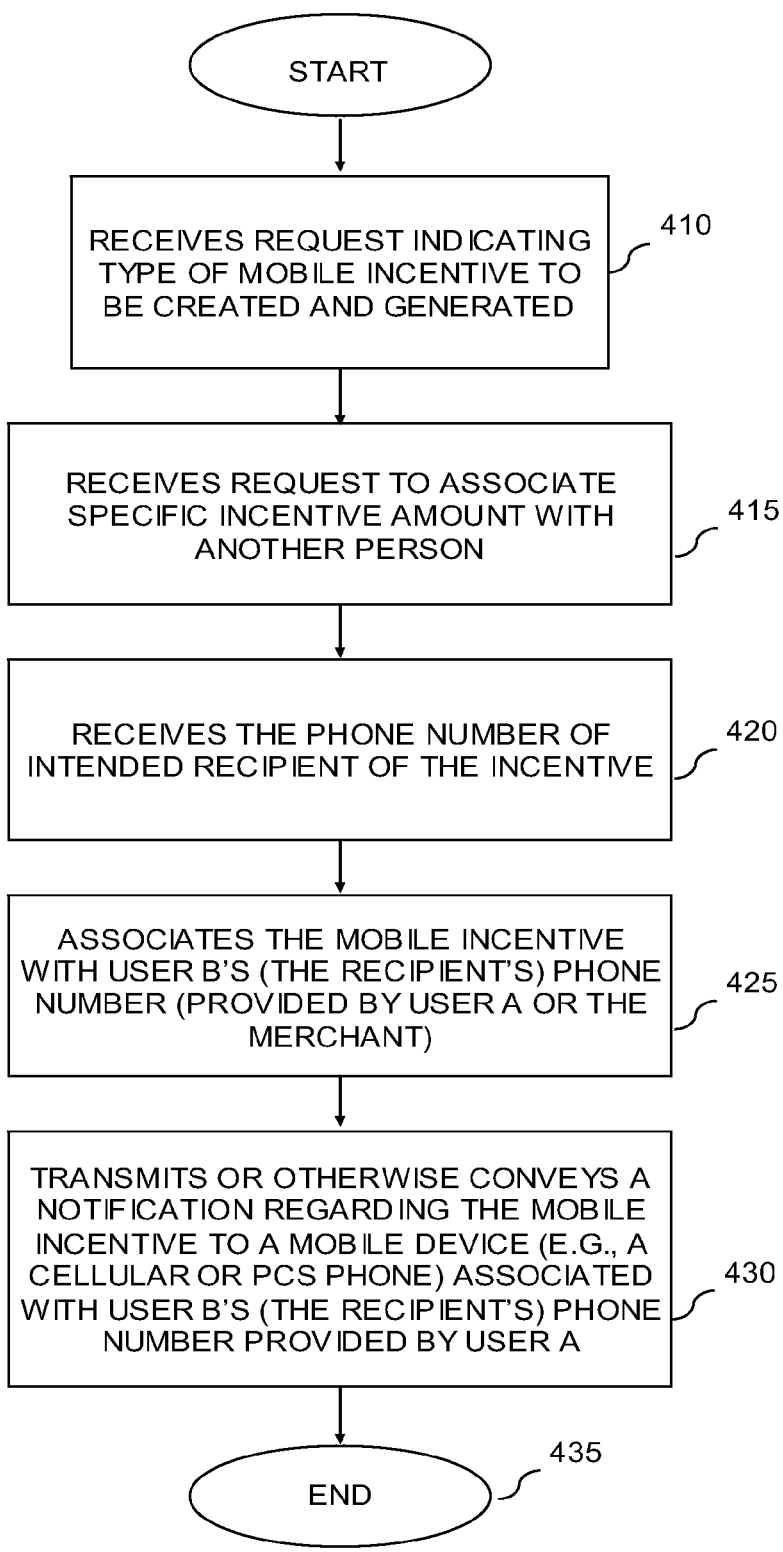
FIG. 4 is a flowchart of a method for distributing a mobile incentive in accordance with an illustrative embodiment of the invention.

FIG. 4 is a flowchart of a method for distributing a mobile incentive in accordance with an illustrative embodiment of the invention. The process may begin when the mobile incentive management platform 340 receives a request, from a merchant, to generate a new mobile incentive. At 410, the mobile incentive management platform 340 receives a request indicating the type of mobile incentive to be created and generated from the merchant, and, at 415, receives a request to associate a specific incentive amount with another person.

At 420, the mobile incentive management platform 340 receives the phone number of the intended recipient of the incentive and, at 425, associates the mobile incentive with User B's (the recipient's) phone number (provided by User A or the merchant). At 430, the mobile incentive management platform 340 transmits or otherwise conveys a notification regarding the mobile incentive to a mobile device (e.g., a cellular or PCS phone) associated with User B's (the recipient's) phone number provided by User A above in Block 425. If the incentive is a free good or service, for example, a free appetizer, User A supplies a monetary value to the free appetizer.

The notification at FIG. 4 may be accomplished in a variety of ways, including, without limitation, an SMS message, an MMS message, a voice message, or an application. The application, in some embodiments, is a WAP browser or other type of Internet browser running on the mobile-gift-card recipient's mobile device. In other embodiments, the application is a specialized application other than a browser.

In some embodiments, the notification to the recipient includes a personalized message created by the merchant such as, "Thank you for your patronage."

Following receipt of the mobile incentive, User B can use the mobile incentive to purchase goods or services from the merchant associated with the mobile incentive in a variety of different ways, as explained above (see discussion of secure payments in connection with FIG. 2 above).

Activation can also take different forms, depending on the particular embodiment. In some embodiments, for example, the notification User B receives includes instructions to User B for how to activate the mobile incentive. For example, the notification may be an SMS message stating, "Bob, you've received a $100 mobile incentive for SPORTS AUTHORITY. Please visit mocapay.com to activate your mobile incentive." Note that, in such embodiments, the notification includes a hyperlinked Uniform Resource Locator (URL) for User B to follow to complete the activation process. Alternatively, User B could be provided with a phone number, an e-mail address, or other contact information for accomplishing activation.

When User B contacts mobile commerce platform 205 to activate the mobile incentive, User B is directed to create an account, if User B does not already have one. Mobile commerce platform 205 guides User B through this straightforward process.

In another embodiment, if User B already has an account with mobile commerce platform 205, the mobile incentive is activated automatically when the notification is transmitted to User B, which makes the mobile incentive available to User B immediately upon receipt of the notification. To redeem the mobile incentive, User B communicates with the server-side digital wallet supported by mobile incentive management platform 340 in the manner described above in connection with FIG. 2.

In another embodiment, mobile incentive management platform 340 receives a specific activation date from User A (the party providing the mobile incentive). For example, if User B's birthday is still five days in the future, User A would like to postpone notification of the mobile incentive until User B's birthday. In such an embodiment, notification of the mobile incentive is conveyed to User B on the activation date specified by User A.

At 435, the method in FIG. 4 terminates.

Figures 5A, 5B:
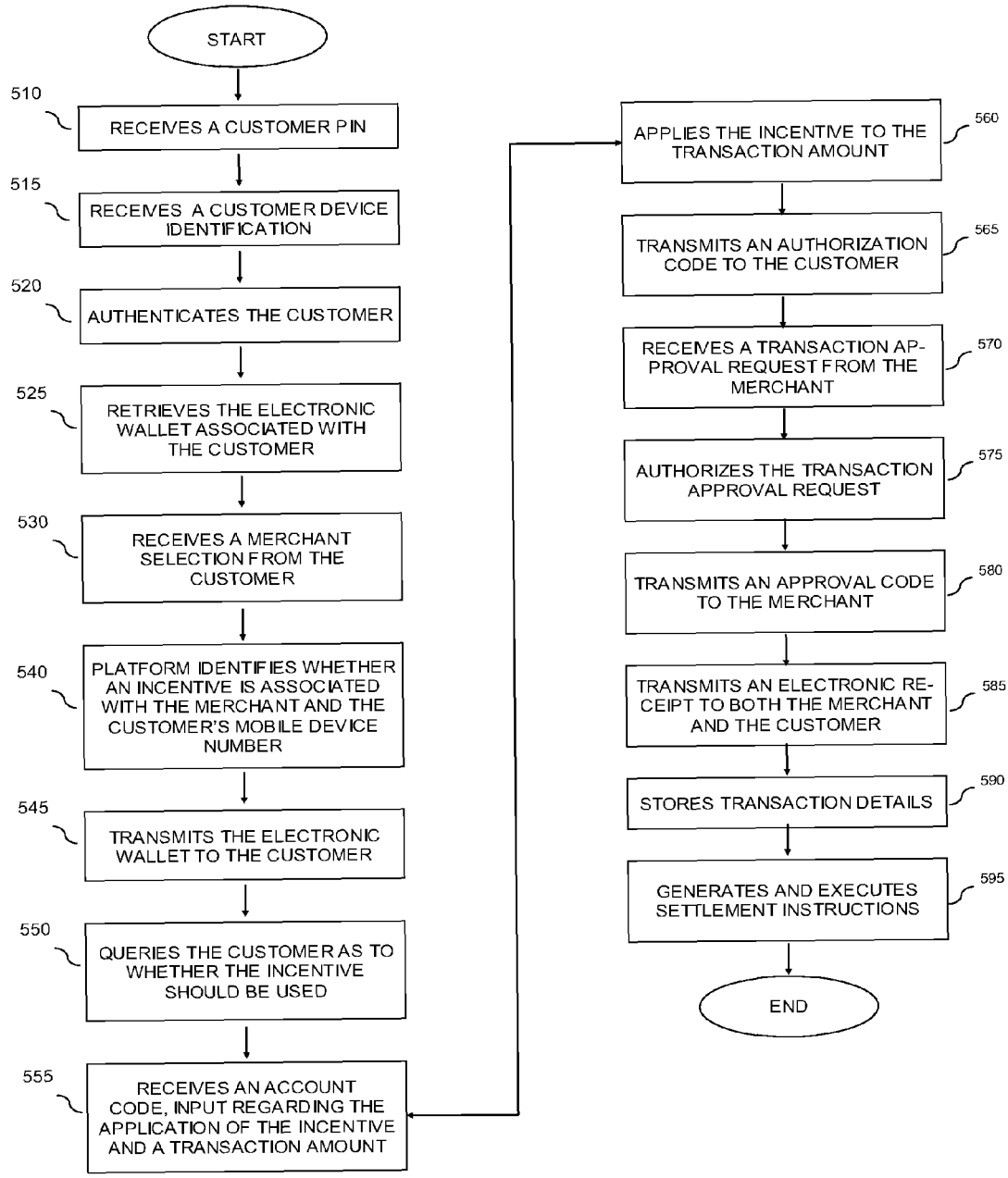
FIGS. 5A and 5B are flowcharts of a method for distributing a mobile incentive in accordance with another illustrative embodiment of the invention.

FIGS. 5A and 5B are a flowchart of a method for redeeming a mobile incentive in accordance with another illustrative embodiment of the invention. At 510, the mobile incentive management platform 340 receives a customer PIN and, at 515, receives a customer device identification. Based on those two pieces of information, the platform authenticates the customer at 520. Once the customer is authenticated, the platform retrieves the electronic wallet associated with the customer at 525. The platform then receives a merchant selection from the customer at 530. Once a merchant is selected, at 540, the platform identifies whether an incentive is associated with the merchant and the customer's mobile device number. The platform, at 545, then transmits the electronic wallet to the customer and, at 550, queries the customer as to whether the incentive should be used. At 555, the platform receives an account code, input regarding the application of the incentive and a transaction amount. Additional information could be transmitted such as identification of the items purchased and associated monetary values.

As shown in FIG. 5B, if the incentive is to be used, the platform applies the incentive to the transaction amount at 560 and transmits an authorization code to the customer at 565. The customer then provides the authorization code to the merchant. At 570, the platform receives a transaction approval request from the merchant. At 575, the platform authorizes the transaction approval request and transmits an approval code to the merchant at 580. At 585, the platform transmits an electronic receipt to both the merchant and the customer. The receipt provides all the pertinent details of the transaction and also shows that the incentive was used and the value of the incentive. The platform then stores the transaction details at 590 and generates and executes settlement instructions at 595.

In conclusion, the present invention provides, among other things, a system and method for distributing compensation and incentives. Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A computer-server-based method for distributing an incentive from a communication device of a merchant to a communication device of a consumer, the computer-server-based method comprising:
    receiving, at a computer server, a request from the communication device of the merchant to distribute the incentive to the communication device of the consumer;
    receiving, at the computer server, a phone number of the communication device of the consumer;
    associating, at the computer server, the incentive with the phone number of the communication device of the consumer;
    transmitting a notification of the incentive to the communication device of the consumer; and
    storing an account number of the consumer identifiable to the merchant at the computer server instead of at the communication device of the consumer such that the computer server communicates with the communication device of the consumer to redeem the incentive to the merchant on behalf of the consumer.

2. The method of claim 1, wherein the communication device of the consumer comprises a mobile device and the identifier comprises a phone number of the mobile device.

3. The method of claim 1, wherein the computer server communicates with the communication device of the consumer over the Internet.

4. The method of claim 1, wherein the incentive comprises a percentage discount.

5. The method of claim 1, wherein the incentive comprises a dollar amount.

6. The method of claim 1, wherein the incentive comprises a free good.

7. The method of claim 1, wherein the incentive comprises a free service.

8. The method of claim 1, wherein the notification includes instructions to the consumer regarding how to redeem the incentive.

9. The method of claim 1, further comprising:
    receiving an activation date for the incentive, wherein the notification of the incentive is transmitted to the communication device of the consumer on the activation date.

10. A system for distributing an incentive from a merchant having a communication device to a consumer having a communication device, the system comprising:
    at least one processor; and,
    a memory containing a plurality of program instructions executable by the at least one processor, the plurality of program instructions being configured to cause the at least one processor to:
        receive a request from the communication device of the merchant to distribute the incentive to the communication device of the consumer;
        receive a phone number of the communication device of the consumer;
        associate the incentive with the phone number of the consumer;
        transmit a notification of the incentive to the communication device associated with the phone number of the consumer; and
        store an account number of the consumer identifiable to the merchant at the computer server instead of at the communication device of the consumer such that the computer server communicates with the communication device of the consumer to redeem the incentive to the merchant on behalf of the consumer.

11. The system of claim 10, wherein the system includes a server in communication with the Internet.

12. The system of claim 10, wherein the incentive comprises a percentage discount.

13. The system of claim 10, wherein the incentive comprises a dollar amount.

14. The system of claim 10, wherein the incentive comprises a free good.

15. The system of claim 10, wherein the incentive comprises a free service.

16. The system of claim 10, wherein the notification includes instructions to the consumer regarding how to redeem the incentive.

17. The system of claim 10, wherein the plurality of program instructions are configured to cause the at least one processor to:
    receive a transaction amount; and
    apply the incentive to the transaction amount.

18. The system of claim 17, wherein the plurality of program instructions are configured to cause the at least one processor to:
    authorize a purchase of goods or services from the merchant according to the transaction amount.

19. The system of claim 17, wherein the plurality of program instructions are configured to cause the at least one processor to:
    transmit an electronic receipt to the electronic device of the consumer, the electronic receipt first and consumers showing details of the transaction, including the applied incentive.

20. The system of claim 10, wherein the plurality of program instructions are configured to cause the at least one processor to:
    receive an activation date for the incentive; and
    transmit the notification of the incentive to the mobile device associated with the identifier of the electronic device of the consumer on the activation date.

* * * * *